May 3, 1960 J. HANSEN ET AL 2,934,817
APPARATUS FOR ASSEMBLING RELAYS
Filed Nov. 27, 1953 6 Sheets-Sheet 3

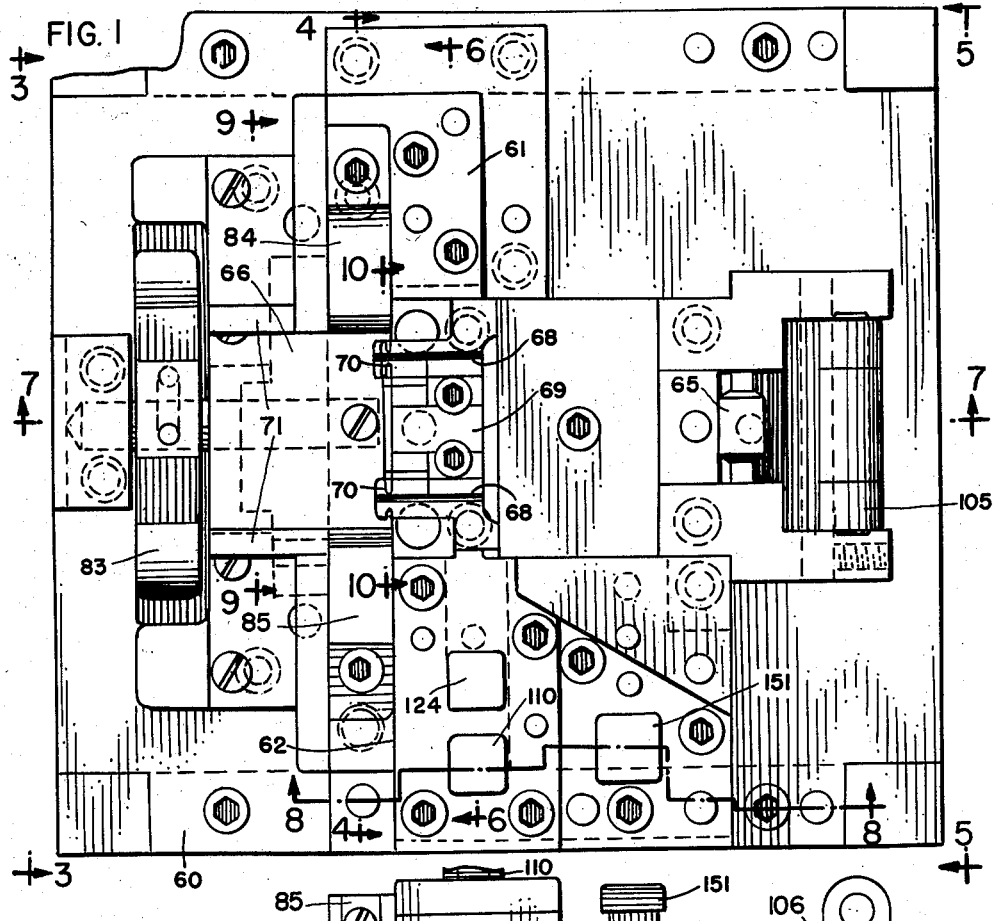
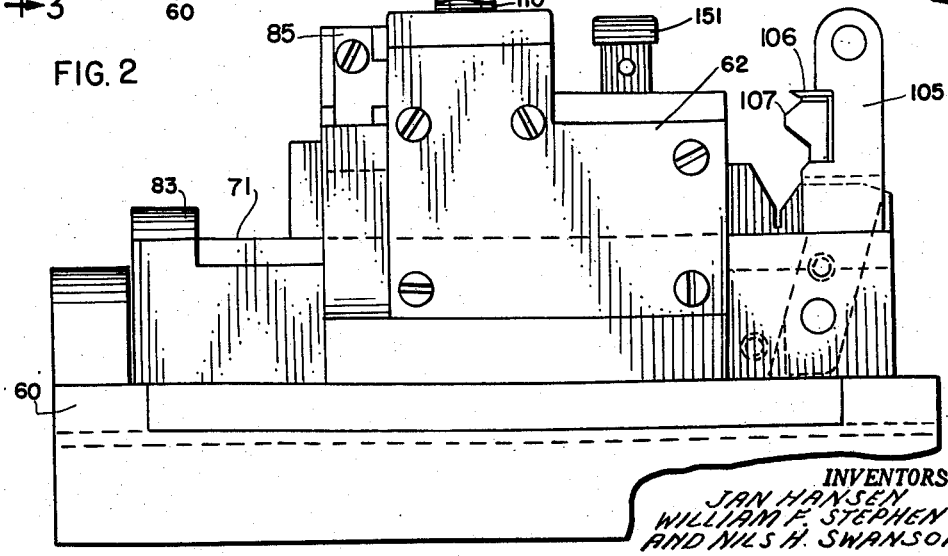

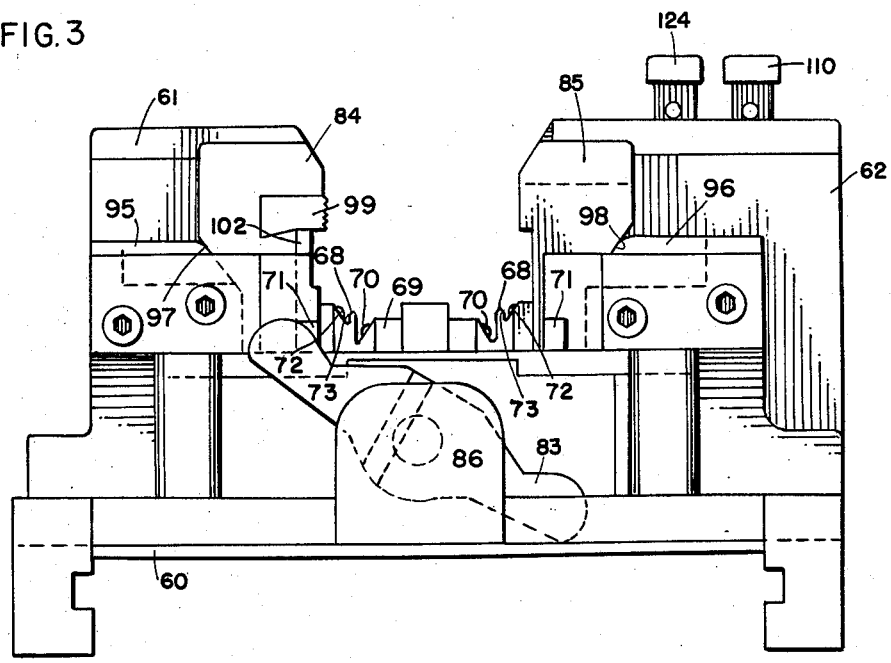
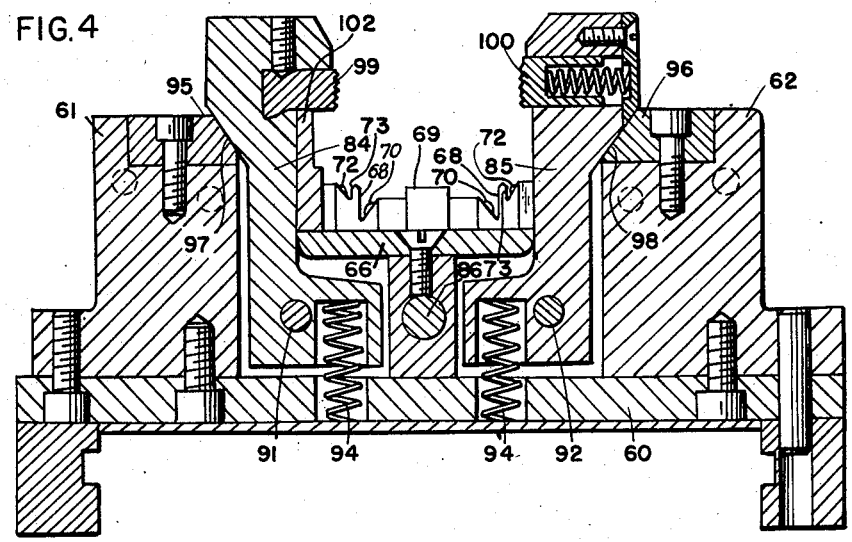
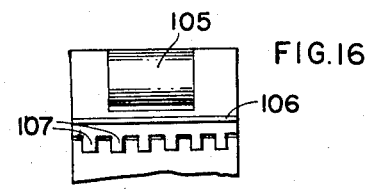

INVENTORS:
JAN HANSEN
WILLIAM F. STEPHEN
AND NILS H. SWANSON
BY C. B. Hamilton
ATT'Y

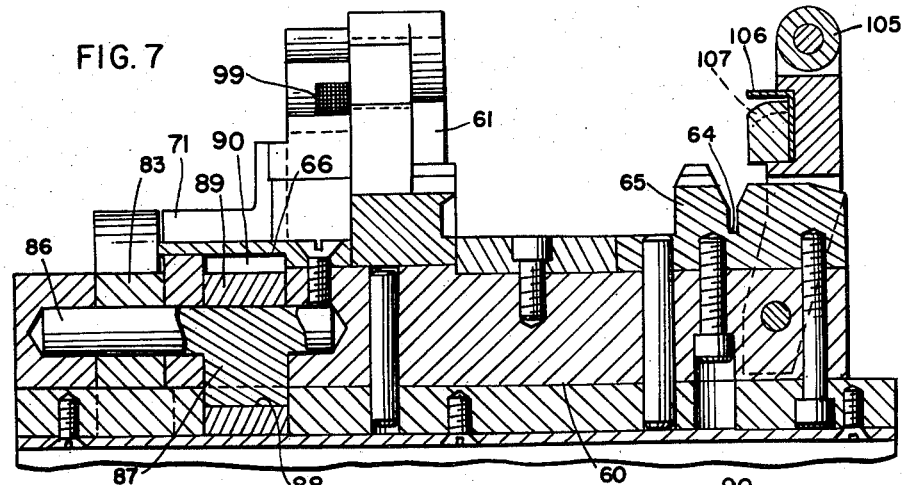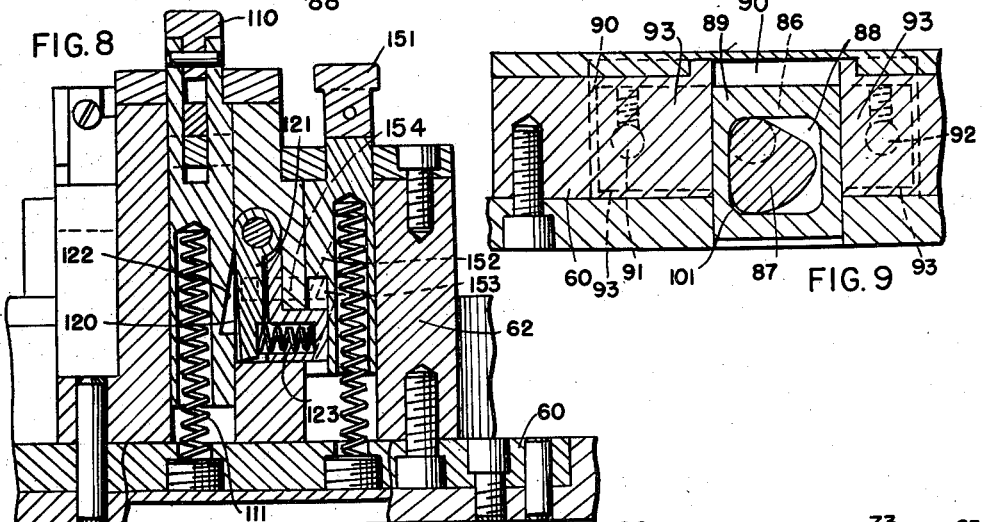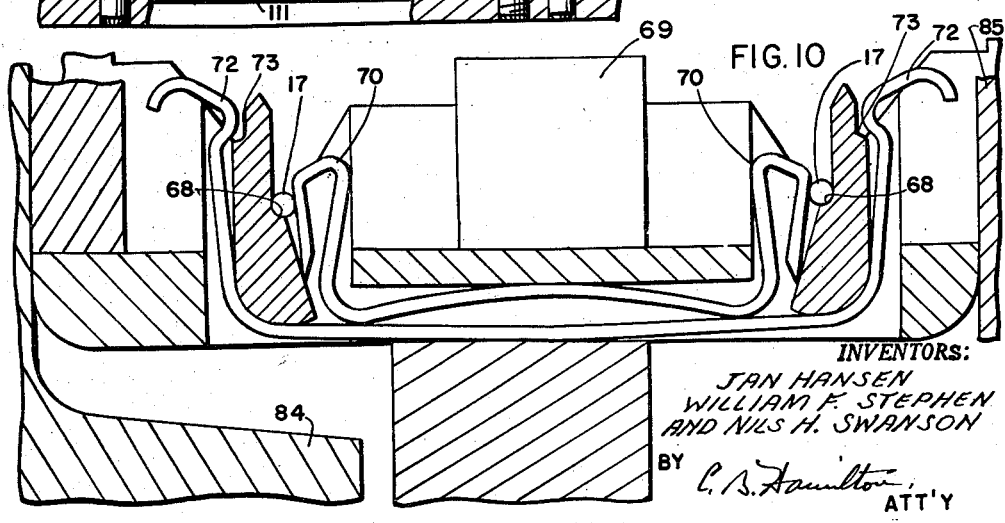

May 3, 1960  J. HANSEN ET AL  2,934,817
APPARATUS FOR ASSEMBLING RELAYS
Filed Nov. 27, 1953  6 Sheets-Sheet 5

INVENTORS:
JAN HANSEN
WILLIAM F. STEPHEN
AND NILS H. SWANSON
BY C. B. Hamilton
ATT'Y May 3, 1960 J. HANSEN ET AL 2,934,817
APPARATUS FOR ASSEMBLING RELAYS
Filed Nov. 27, 1953 6 Sheets-Sheet 6

INVENTORS
JAN HANSEN
WILLIAM F. STEPHEN
AND NILS H. SWANSON
BY C. B. Hamilton
ATT'Y United States Patent Office  2,934,817
Patented May 3, 1960

2,934,817

APPARATUS FOR ASSEMBLING RELAYS

Jan Hansen, Chicago, William F. Stephen, Elmwood Park, and Nils H. Swanson, La Grange, Ill., assignors to Western Electric Company, Incorporated, New York, N.Y., a corporation of New York Application November 27, 1953, Serial No. 394,744

10 Claims. (Cl. 29—203)

This invention relates to apparatus for assembling relays, and more particularly to apparatus for assembling wire spring relays.

An object of the invention is to provide a new and improved apparatus for assembling relays.

Another object of the invention is to provide apparatus for assembling wire spring relays.

A further object of the invention is to provide apparatus for securely holidng each of many elements of a wire spring relay in position as it is assembled.

An apparatus illustrating certain features of the invention may comprise means for holding a relay coil assembly positioned to receive an armature, and means for clamping a mounting block in a position securing an armature to the relay coil assembly and interlocking with the relay coil assembly. Means are provided for clamping a molded plate of a first or lower wire relay comb on the mounting block, and a holder having sockets for receiving contacts of the first wire relay comb and holding the contacts in predetermined positions is movable into position to secure the contacts in such positions. A second or intermediate wire relay comb then is clamped in a position on the first comb in which bosses of the second wire comb enter holes in the first wire comb, and the holder supports the contacts of the second wire comb in predetermined positions relative to the contacts of the first wire comb. Means are provided for clamping a third or upper wire relay comb in a position in which dowel pins of the second comb enter holes in the third comb, and a clamp forming part of the relay is pressed over the assembly to lock the parts together, after which the several parts are released and the assembled relay is removed from the apparatus.

A complete understanding of the invention may be obtained from the following detailed description of an apparatus forming a specific embodiment thereof, when read in conjunction with the appended drawings, in which:

Fig. 1 is a top plan of an apparatus forming a specific embodiment of the invention;

Fig. 2 is a side elevation of the apparatus shown in Fig. 1;

Fig. 3 is a front elevation taken along line 3—3 of Fig. 1;

Fig. 4 is a vertical section taken along line 4—4 of Fig. 1 showing the arms moved downward and cammed inward;

Fig. 7 is a vertical section taken along line 7—7 of Fig. 1;

Fig. 8 is a fragmentary vertical section taken along line 8—8 of Fig. 1;

Fig. 9 is a fragmentary vertical section taken along line 9—9 of Fig. 1;

Fig. 10 is an enlarged, fragmentary vertical section taken along line 10—10 of Fig. 1;

Fig. 16 is a fragmentary front view of the wire holder.

Figure 15:
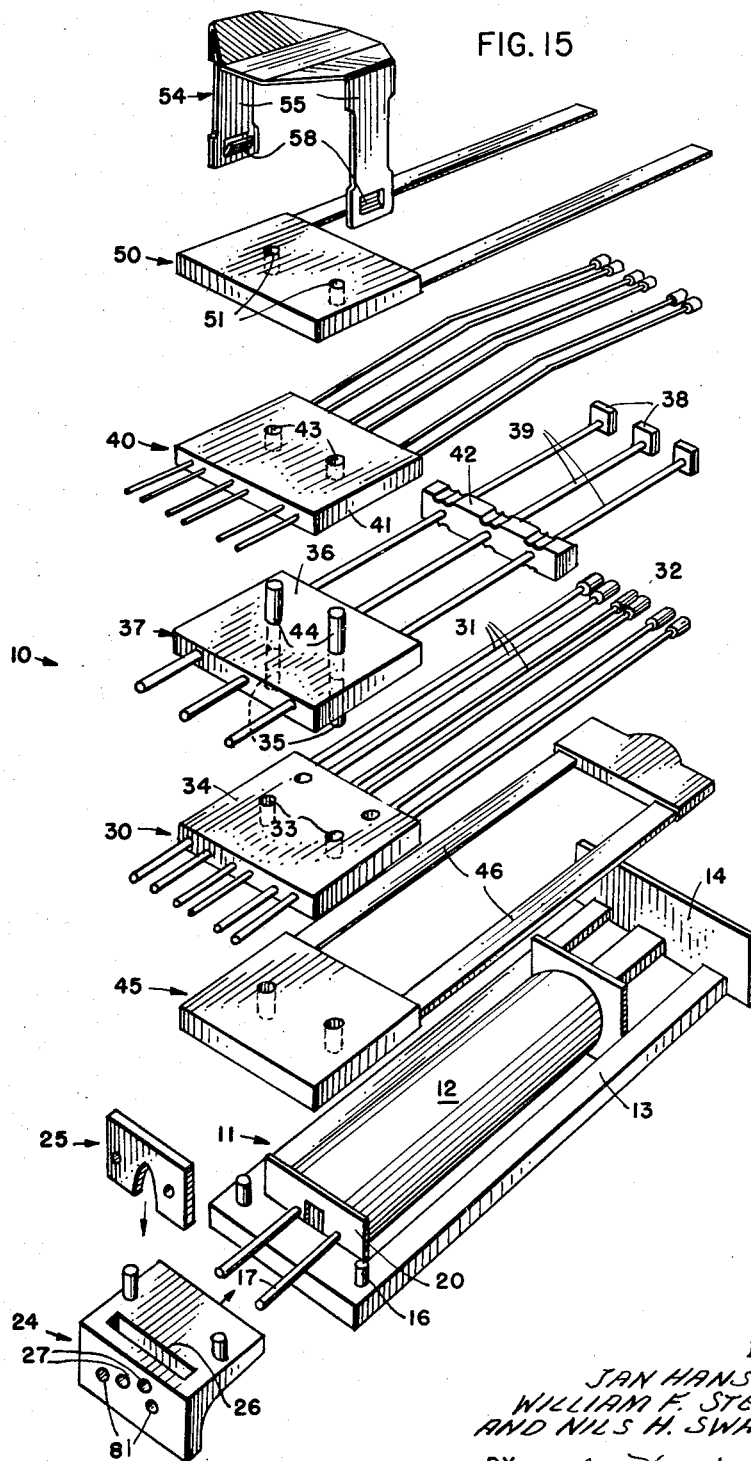
Fig. 15 is an exploded view of an article to be assembled by the apparatus shown in Fig. 1.

Referring now in detail to the drawings, there is shown therein an apparatus for assembling a wire spring relay 10 (Fig. 15) which includes a coil assembly 11 having an electromagnetic coil 12 and a core 13 of magnetic material having an end plate 14 secured to one end thereof transversely of the core which is provided with bosses 16. Rigid wires 17 connected to leads (not shown) of the coil are mounted on insulating plate 20 and project beyond the core. A mounting block 24 carrying a U-shaped nut 25 in a slot 26 thereof is provided with holes 27 through which the rigid wires 17 project in the final assembly. A lower or first comb 30 having pairs of wires 31 and terminals 32 projecting therefrom is provided with bores 33 in a molded plate 34 to receive bosses 35 from a molded plate 36 of a second or intermediate comb 37 provided with contacts 38 on the ends of wires 39 thereof and grooved, wire separator 42. A third or upper comb 40 has a molded plate 41 having bores 43 for receiving bosses 44 on the second or intermediate comb 37. Thus, the bosses 35 and 44 align the combs 30, 37 and 40 in the assembled relay. An armature 45 provided with leaf spring arms 46 is designed to fit over the bosses 16 of the core 13. A biasing spring plate 50 is provided and has holes 51 designed to fit over the bosses 44. A U-shaped spring clamp 54 having arms 55 is designed to be pressed over the assembled elements so that tabs 58 catch on the core 13 to secure the assembly of parts together.

The apparatus includes a base 60 having spaced arms 61 and 62 projecting upwardly from the face thereof. The coil assembly 11 is placed on the base 60 with the core plate 14 projecting into a slot 64 (Fig. 7) in a block 65, and the lead wires 17 are manually pressed into grooves 68 in a block 69 and are latched in these positions by latches 70, which snap over the wires. The coil assembly rests on a fixed bed 66 mounted on the base 60 (Figs. 4 and 7). The mounting block 24 (Figs. 11 through 14) then is slid along guides 71 until the lead wires 17 just project into the bores 27 in the mounting block, and then is left in this position while the armature 45 is placed on the core 13 with the bosses 16 of the core projecting into the holes in the arms of the armature. Other types of coil assemblies are provided with lead wires positioned similarly to the lead wires 17, but which are higher and spaced farther apart. When a coil assembly of this type is positioned on the device, its lead wires are held by latches 72 positioned in grooves 73 in the block 69.

The mounting block 24 is then slid further onto the leads 17, the guides 71 serving to guide the block 24, and is placed over the bosses 16 with the bosses entering holes 75 (Fig. 11) in the mounting block to precisely locate the mounting block. Then, the U-shaped nut 25 is dropped into the slot 26 in the mounting block 24 with the tapped bores in the nut aligned with bores 81 in the mounting block 24, the nut 25 being provided with a central opening through which the wires 17 pass. The tapped bores in the nut 25 are adapted to receive mounting screws (not shown) which extend through the bores 81 and serve to hold the relay in assembled position in an electrical component. A lever 83 is then turned in a clockwise direction, as viewed in Fig. 3, which moves arms 84 and 85 pivotally toward one another and down to precisely center the mounting block and hold it down against the base 60. This movement of the arms 84 and 85 is effected through a shaft 86 keyed to the lever and a cam 87 movable in a slot 88 in a bar 89 vertically slidable in a guideway 90 in the base 60. Projecting arms 93 (Fig. 9) of the bar 89 support rods 91 and 92 rigidly, which support the clamping arms 84 and 85 (Fig. 4) pivotally.

When the cam 87 is turned to the position thereof shown in Fig. 9, the rods 91 and 92 pull the arms downwardly against springs 94 to the positions shown in Fig. 4, and wedges 95 and 96 (Fig. 4) acting against wedge surfaces 97 and 98 on the arms force the upper ends of the arms toward one another to bring an overhanging stationary lower jaw 99 and an overhanging spring-pressed lower jaw 100 opposed to the jaw 99 down against the top of the mounting block 24 to securely clamp the mounting block, the core 13 and the armature 45 in their assembled positions. The overhanging jaws 99 and 100 form, in effect, hooks for pressing the block downwardly. The cam 87 is locked in this position by the action of a lobe 101 (Fig. 9) thereof which is overcenter slightly relative to the shaft. A member 102 (Fig. 4) secured to the bed 66 engages the jaw 99 to limit downward movement of the arms 84 and 85.

Figure 5:
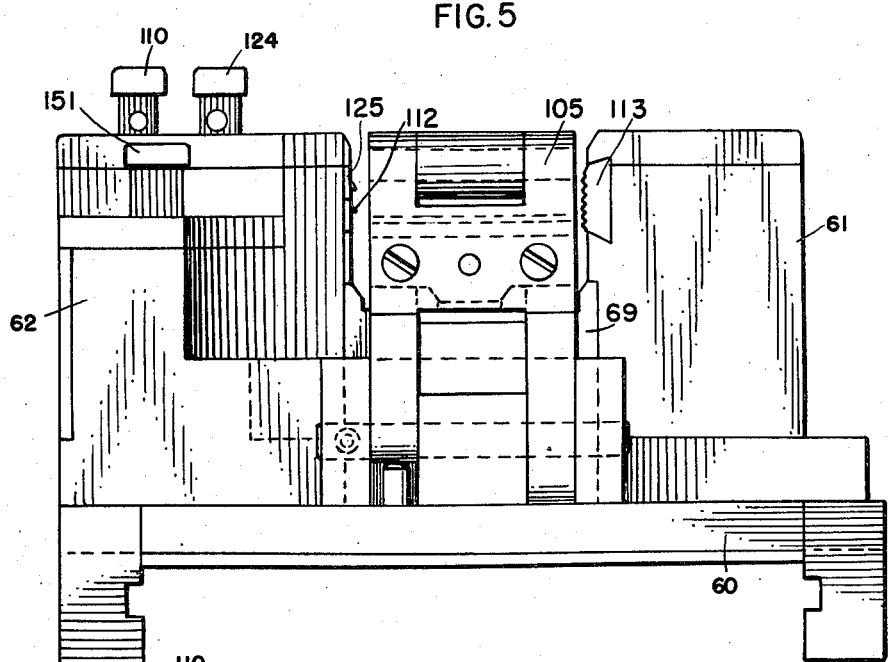
Fig. 5 is a rear elevation taken along line 5—5 of Fig. 1.
Figure 6:
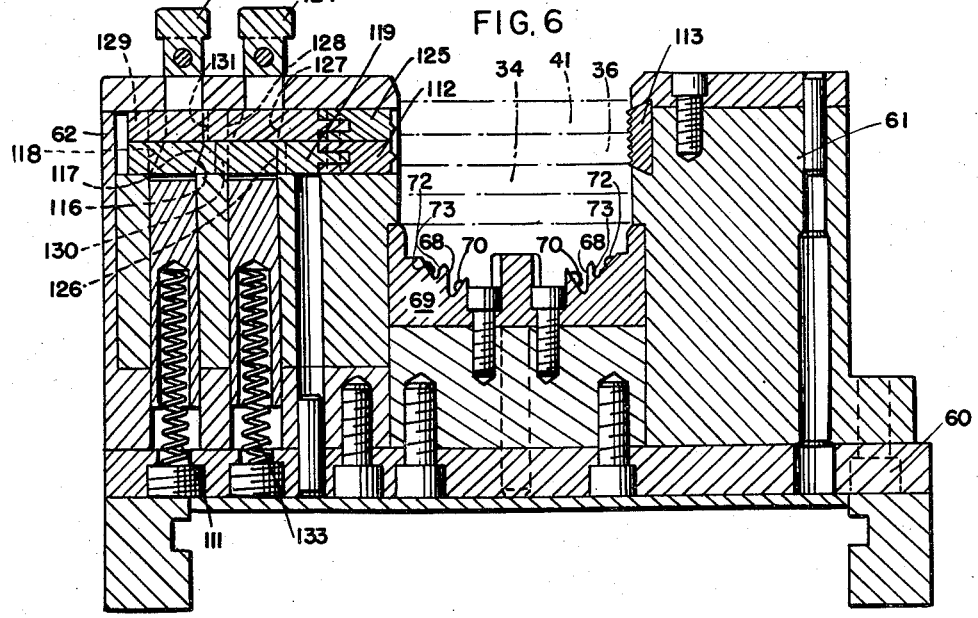
Fig. 6 is a vertical section taken along line 6—6 of Fig. 1.
Figure 11:
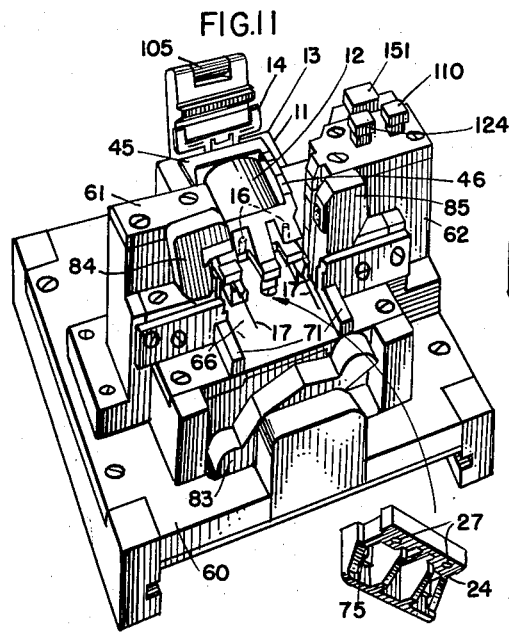
Fig. 11 is a perspective view of the apparatus shown in Fig. 1 during one stage in the operation thereof.
Figure 12:
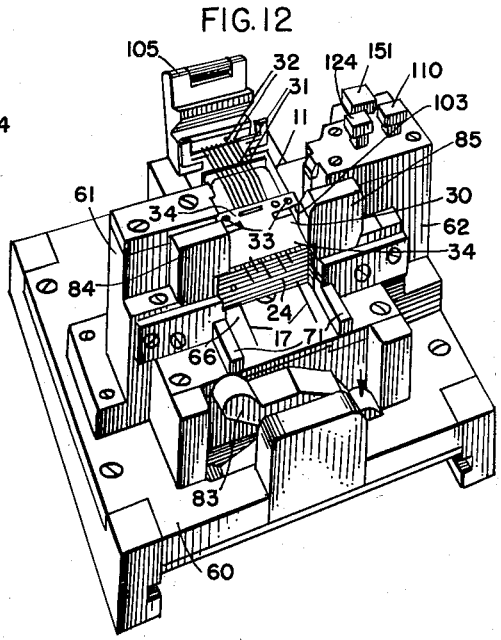
Fig. 12 is a perspective view similar to Fig. 11 during another stage in the operation of the apparatus.
Figure 13:
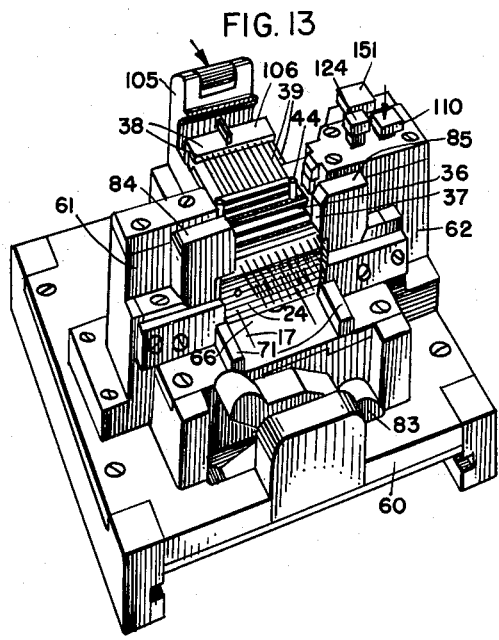
Fig. 13 is a perspective view similar to Figs. 11 and 12 during another stage in the operation of the apparatus.
Figure 14:
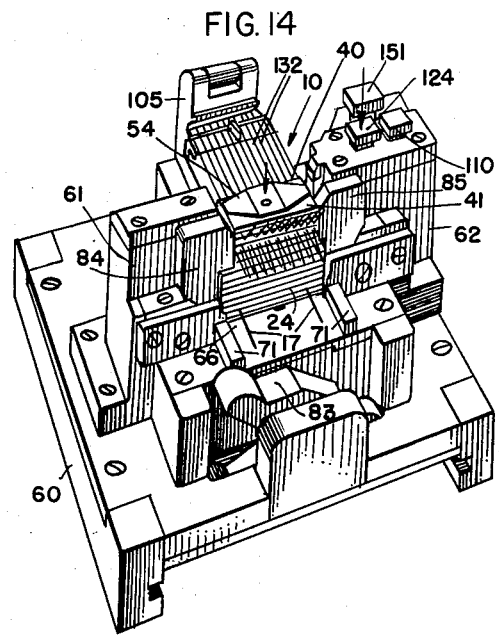
Fig. 14 is a perspective view similar to Figs. 11, 12 and 13 during the final stage in the operation of the apparatus.

The first or lower wire comb 30 (Fig. 12) is then placed on the mounting block in the proper position between the lower jaws 99 and 100 with edges of the block 34 abutting the jaws 99 and 100 of the arms 84 and 85 and being clamped therebetween. A holder 105 is swung manually to a position receiving the terminals 32 below a supporting plate or shelf 106 and in sockets 107 and stays in this position by friction. The second or intermediate comb 37 then is placed on the first or lower comb with the bosses 35 entering the bores 33 in the first or lower comb, and the contacts 38 rest on the plate or shelf 106 of the holder 105, in which position the second or intermediate comb is horizontal, the plate 36 thereof lies flat on the plate 34 of the first or lower comb 30, and the grooved separator 42 (Fig. 15) is in a position receiving the wires 31 in the grooves therein. A plunger 110 (Figs. 6 and 8) is then pressed manually downwardly against the action of a spring 111 to press a sharp-toothed intermediate jaw 112 to the right, as viewed in Fig. 6, to clamp the plate 36 securely between the jaw 112 and a fixed sharp-toothed intermediate jaw 113. A cam surface 116 of the plunger 110 acts against a cam surface 117 of a slot 118 in a slide 119 pinned to the jaw 112. A latching tooth 120 of an arm 121 is pressed into a notch 122 in the plunger 110 by a spring 123 to latch the plunger 110 in position holding the intermediate jaw 112 in clamping engagement with the second or intermediate comb 37.

The third or upper comb 40 (Fig. 14) then is placed in a proper position for assembly on the second or intermediate comb 37, in which position the bosses 44 of the comb 37 project into the bores 43, and the wires 132 of the comb 40 fit into the upper grooves in the separator 42. A plunger 124 then is pressed down manually against a spring 133 to press an upper jaw 125 to the right, as viewed in Fig. 6, to clamp the plate 41 between the upper portion of the jaw 113 and the upper jaw 125. The plunger 124 actuates the upper jaw 125 by a cam 126 acting on a cam surface 127 forming a portion of a slot 128 in a slide 129 pinned to the jaw 125. Clearance slots 130 and 131 are formed in the slides 119 and 129 to prevent interference between the slides and the plungers. The plunger 124 is locked in its down position by a latch similar to the latch 121. The biasing spring plate 50 then is placed over the bosses 44 of the middle comb 37. A U-shaped clamp 54 is placed over the assembly of parts and is locked to the core 13.

A latch release plunger 151 (Fig. 8) then is pressed manually or otherwise is brought down, and cam slots, of which a cam slot 152 (Fig. 8) is shown, through pin connections, of which a pin connection 153 on a pull rod 154 secured to the lever 121 is shown, pull the lever 121 and the similar lever (not shown) associated with the plunger 124 in a counterclockwise direction, as viewed in Fig. 8. This releases the plungers 110 and 120, and the springs 111 and 133 raise the plungers 110 and 120 to pull the jaws 112 and 125 back. The holder 105 then is swung in a clockwise direction, as viewed in Fig. 7, to free the ends of the combs 30 and 37, and the assembled relay is removed from the apparatus.

The above-described fixture serves to precisely locate each part of the relays to be assembled with great rapidity and holds these elements in precisely located positions while they are being clamped.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for assembling a first wire comb having wires projecting therefrom and a second comb having wires projecting therefrom, which comprises a base, support means on the base, first means on the base for clamping a first wire comb in a predetermined position, a holder movably mounted on the base and having a plurality of spaced sockets for receiving and holding the projecting ends of the wires in spaced alignment, means on the base for actuating the first clamping means, second means on the support means for clamping a second comb on the first comb, and means on the support means for actuating the second clamping means.

2. An assembling apparatus, which comprises a base, support means on the base, first means on the base for clamping a coil assembly on the base, means on the base for actuating the first clamping means, said first clamping means also holding a wire spring relay comb on the coil assembly, said first comb having secured thereto a plurality of wires having free ends, means on the base for actuating the first clamping means, a holder movably mounted on the base and having a plurality of sockets for receiving and holding the free ends of the wires of said first comb in spaced alignment, second means on the support means for clamping a second wire comb on the first wire comb, and means on the support means for actuating the second clamping means.

3. An assembling apparatus, which comprises a base, a plurality of elements on the base for supporting a relay coil assembly in a predetermined position, a pair of arms movably mounted on the base, a first pair of jaws on the arms for engaging and clamping a first wire comb on the coil assembly, said wire comb having secured thereto a plurality of wires having free ends, means on the base for actuating the movably mounted arms, a holder movably mounted on the base and having a plurality of spaced sockets for receiving the free ends of said wires to hold the wires in spaced alignment, support means on the base, a second pair of jaws on the support means for clamping a second wire comb on said first comb, and means on the support means for actuating said second clamping means.

4. An assembling apparatus, which comprises a base, a plurality of elements mounted on the base for locating a relay coil assembly in a position on said base, a guideway positioned on the base for guiding a mounting block onto a pair of wires projecting from the coil assembly, a pair of arms each having a jaw near one end thereof, means supporting the arms pivotally on the base, means on the base mounting the arms-supporting means for vertical movement, means for moving the arms-supporting means downwardly to pull the arms downwardly, and camming means on the base for pressing the jaws over the mounting block to secure the mounting block and the assembly to the base.

5. An assembling apparatus, which comprises a base, a plurality of elements mounted on the base for locating a relay coil assembly in a position thereon, a guideway positioned on the base for guiding a mounting block onto a pair of wires projecting from the coil assembly, a pair of arms each having a jaw at one end thereof, a frame on the base supporting the arms pivotally, means on the base mounting the frame for vertical movement, means on the base for moving the frame downwardly to pull the arms downwardly, and cam means on the guide posts for pressing the jaws over the mounting block to secure the mounting block and the assembly to the base.

6. An assembling apparatus, which comprises a base, a pair of guide posts projecting upwardly from the base, a plurality of elements on the base for locating a relay coil assembly in a position between the guide posts, a guideway on the base for guiding a mounting block onto a pair of wires projecting from the coil assembly, a frame movably mounted on the base, a pair of arms movably mounted on the frame, a first pair of jaws mounted on the arms, means on the base for moving the frame downwardly to move the first pair of jaws into engagement with the mounting block to hold said block on the coil assembly, support means on the base, cam means on the support means for moving the arms together during the downward movement thereof whereby the first pair of jaws engages an upper surface of the mounting block, one of said first jaws being resiliently mounted on one of said arms for cooperating with the other of said first pair of jaws to clamp a first wire comb therebetween, said wire comb having secured thereto a plurality of wires, a holder mounted on the base for engaging and maintaining said wires in spaced alignment, a second pair of jaws on the support means for clamping a second wire comb on the first wire comb, and means on the support means for actuating said second pair of clamping jaws.

7. An assembling apparatus, which comprises a base, a pair of guide posts secured to and extending upwardly from the base, a plurality of elements on the base for cooperating to support a relay coil assembly in a position between said posts, a pair of arms movably mounted on the base, a first pair of jaws mounted on said arms for clamping a mounting block on the coil assembly, said jaws also cooperating to clamp a first wire comb on the mounting block, means on the base for actuating the arms, a second pair of jaws mounted on the guide posts, one of said second pair of jaws being movably mounted for cooperating with the other jaw of said second pair to clamp a second wire comb therebetween on said first wire comb, a plunger movably mounted on one of the guide posts and having a cam surface engaging said movable second jaw for actuating said movable second jaw, and latching means connected to said plunger for holding said plunger to retain said movable second jaw in actuated position.

8. An apparatus for assembling wire-spring relays, comprising a base, a pair of guide posts secured to and projecting upwardly from the base, a plurality of elements mounted on the base for supporting a coil assembly in a predetermined position between the guide posts, a guideway on the base for guiding a mounting block into assembled relationship with the coil assembly, a frame on the base, a pair of arms pivotally secured to the frame, a cam mounted on the base and engaging the frame for moving said frame to carry the arms downward, a lever connected to the cam for operating said cam, said guide posts having cam surfaces thereon for engaging and forcing the arms toward each other during the downward movement of said arms, a first pair of jaws mounted on the arms for engaging and holding the mounting block on the coil assembly, said first pair of jaws being carried toward each other by the downwardly moving arms whereby lower surfaces of the jaws engage an upper surface of the mounting block, one of said first pair of jaws being resiliently mounted for cooperating with the other jaw of said first pair to clamp a first wire comb therebetween on the mounting block, said first comb having secured thereto a plurality of wires having free ends, a holder pivotally secured to the base and having a plurality of spaced sockets for receiving the free ends of the wires to hold said wires in spaced alignment, a second pair of jaws mounted on the guide posts, one of said second pair of jaws being movably mounted for cooperating with a lower portion of the other jaw of said second pair to clamp a second wire comb therebetween, a first plunger movably mounted on one of the guide posts and connected to the movable second jaw for actuating said jaw, a first latch connected to the first plunger for holding said plunger to retain the movable second jaw in actuated position, another jaw mounted on one of the guide posts above said movable jaw of said second pair, said another jaw being movably mounted for cooperating with an upper portion of the other jaw of said second pair to clamp a third wire comb therebetween, a second plunger movably mounted on said one guide post and connected to said another jaw for actuating said jaw, and a second latch connected to the second plunger for holding said plunger to retain said another jaw in actuated position.

9. A device for holding components of an article in stacked position, comprising a base for supporting a first component, a pair of arms each having a jaw at one end for engaging and holding a second component on the first component, said arms being mounted on the base, means on the base for actuating the arms, a first jaw movably mounted above the base for moving toward and cooperating with a lower portion of a fixed jaw to hold a third component therebetween, means on the base for actuating the first jaw, a second jaw movably mounted above the first jaw for moving toward and cooperating with an upper portion of said fixed jaw to hold a fourth component therebetween, and means on the base for actuating the second jaw.

10. A device for holding components of an article in stacked relationship, comprising a base for supporting a first component, a pair of arms movably mounted on the base and having a pair of jaws secured thereto for holding a second component on the first component, means on the base for actuating the arms, a fixed jaw supported above the base, a first movable jaw on the base for moving toward and cooperating with a lower portion of the fixed jaw to engage and hold a third component on the second component, first means on the base for actuating the first movable jaw, first latch means on the base for holding said first movable jaw in actuated position, a second movable jaw mounted above the base for moving toward and cooperating with an upper portion of said fixed jaw to engage and hold a fourth component therebetween, second means on the base for actuating said second movable jaw, and second latch means on the base for holding said second movable jaw in actuated position.

References Cited in the file of this patent

UNITED STATES PATENTS

| | | |
|---|---|---|
| 1,048,821 | Gill | Dec. 31, 1912 |
| 2,121,851 | Barrett | June 28, 1938 |
| 2,326,982 | Summers et al. | Aug. 17, 1943 |
| 2,425,127 | Schafer | Aug. 5, 1947 |